United States Patent [19]

Weustink

[11] Patent Number: 5,192,243

[45] Date of Patent: Mar. 9, 1993

[54] APPARATUS FOR PROCESSING FLATFISH

[75] Inventor: Wilhelmus J. H. Weustink, P.O. Box 16, 1510 AA Oostzaan, Netherlands

[73] Assignee: Wilhelmus Josephus Henricus Weustink, Oostzaan, Netherlands

[21] Appl. No.: 703,462

[22] Filed: May 21, 1991

[30] Foreign Application Priority Data

May 31, 1990 [JP] Japan .................................... 9001240

[51] Int. Cl.$^5$ ............................................. A22C 25/14
[52] U.S. Cl. ..................................... 452/157; 452/161
[58] Field of Search ................. 452/161, 158, 170, 157, 452/149, 150, 156

[56] References Cited

U.S. PATENT DOCUMENTS 4,557,019 12/1985 Van Devanter et al. ............ 452/157
4,726,094 2/1988 Braeger ................................ 452/157
4,738,004 4/1988 LaPeyre ................................ 452/158
4,875,254 10/1989 Rudy et al. .......................... 452/157

Primary Examiner—Willis Little
Attorney, Agent, or Firm—Dority & Manning

[57] ABSTRACT

The invention relates to an apparatus for processing flatfish comprising a conveyor means for the flatfish, registration means for determining the geometry of the flatfish and their position relative to the conveyor means, a cutting device for cutting loose the head, the dorsal fin, the anal fin and the tail fin from the flatfish and with a control unit connected between the registration means and the cutting device. Preferably the cutting device comprises cutting means which follow a track which includes an angle with the transverse direction of the conveyor means.

10 Claims, 1 Drawing Sheet

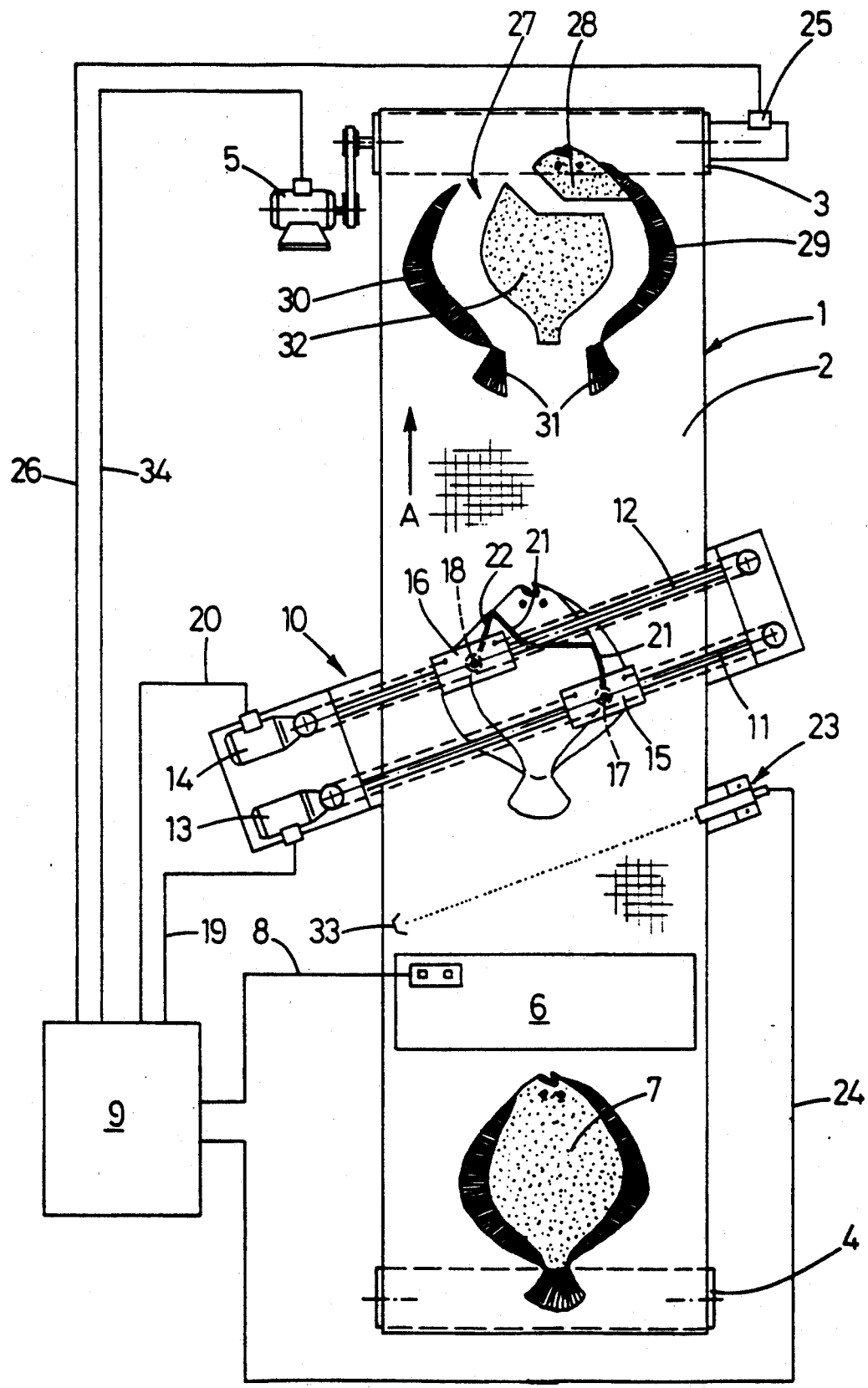

APPARATUS FOR PROCESSING FLATFISH

BACKGROUND OF THE INVENTION

The invention relates to an apparatus for processing flatfish. In a known apparatus for processing flatfish provisions are made for removing fat brims from the circumference of flatfish filets. The fishbones and alike of the flatfish filets supplied to this known apparatus have already been removed.

Making flatfish ready to cook comprises among others cutting loose the head, the dorsal fin, the anal fin and the tail fin from the flatfish. Nowadays these operations are carried out manually. These manual operations require large skills, whereas moreover severe hygienic conditions have to be fulfilled.

It is an object of the invention to provide an apparatus for processing flatfish with which the operations carried out manually now can be carried out automatedly.

Thus the apparatus for processing flatfish in accordance with the invention is characterised by a conveyor means for the flatfish, registration means for determining the geometry of the flatfish and their position relative to the conveyor means, a cutting device for cutting loose the head, the dorsal fin, the anal fin and the tail fin from the flatfish and with a control unit connected between the registration means and the cutting device.

The flatfish supplied by means of the conveyor means are registered by the registration means in respect of their geometry and their position. The data obtained by the registration means are transferred to the control unit which, in accordance with these data, controlles the cutting device such, that the head, dorsal fin, anal fin and tail fin are cut loose from the flatfish.

Using such an apparatus the flatfish are processed mainly automatedly. It is possible that previous to processing the flatfish by means of the apparatus the intestines of the flatfish have already been removed. However, this is not necessary.

Supplying the flatfish to the conveyor means may occur automatedly or manually. Because the registration means determine the position of the flatfish relative to the conveyor means it is not necessary to supply each flatfish in exactly the same position to the conveyor means. Thus the apparatus will be very versatile in its use. Because the registration means further determine the geometry of the flatfish this apparatus can without problems be used for flatfish having varying dimensions.

For processing the flatfish now occurs completely automatedly fulfilling hygienic conditions requires less efforts compared to a manual processing. Further, using the apparatus according to the invention, a larger number of flatfish can be processed each hour than would be possible manually. Finally the automation of the processing of the flatfish means that the products obtained have a constant quality.

Preferably the apparatus according to the invention is characterised in that the cutting device comprises at least two cutting means which are essentially transversaly to the conveyor means and mutually independently movable to and fro. Using these two cutting means the head, dorsal fin, anal fin and tail fin can be removed during one single passage of the flatfish through the cutting device.

In this respect it is advantageous, if the track followed by the cutting means includes an angle with the transverse direction of the conveyor means. As a result the cutting means can make cuts in the flatfish which extend perpendicularly to the direction of movement of the conveyor means.

Further it is advantageous if the registration means comprise an X-ray device. Such an X-ray device can make an image of the geometry of the respective flatfish, thus providing information about the position of the fishbones. This information is processed by the control unit and transformed into control signals for the cutting device. Moreover, such an X-ray device can be applied for checking the flatfish on the present of irregularities.

BRIEF DESCRIPTION OF THE DRAWING

Hereinafter the invention will be elucidated referring to the only figure, in which schematically is illustrated a plan view of an embodiment of the apparatus according to the invention.

DESCRIPTION OF THE PREFERRED EMBODIMENT

The illustrated apparatus comprises a conveyor means shaped as a belt conveyor 1 which is provided with a gauze conveyor belt 2. The conveyor belt 2 is guided around two rolls 3 and 4 of which roll 3 is driven by a motor 5. The rolls 3 and 4 are borne in a frame or alike in a way not shown further. Although in the embodiment illustrated the belt conveyor 1 comprises only one conveyor belt 2 it is obviously possible that the belt conveyor comprises several adjoining conveyor belts. Thus it is possible that the registration means to be described next are positioned at a first conveyor belt whereas the cutting device to be described next is positioned at a second conveyor belt. As a result the apparatus obtains a modular construction which is advantageous when transporting the apparatus and when replacing parts thereof.

It is noted that the direction of movement of the conveyor belt 2 is indicated by arrow A.

In the direct environment of the conveyor belt 2 firstly (as seen in the direction of movement of the conveyor belt) registration means 6 are provided. These registration means 6 preferably comprise an X-ray device with which a passing flatfish 7 can be X-rayed.

On the one hand the registration means 6 determine the position of a flatfish 7 relative to the conveyor belt 2, thus providing information about the orientation of the flatfish 7 relative to this conveyor belt 2. At the other hand however the registration means 6 determine the geometry of the flatfish. In this respect geometry means the outer shape of the flatfish 7 as well as the location of fishbones and alike in the flatfish 7.

The registration means 6 are connected to a processing and control unit 9 through a line 8. In this processing and control unit 9 the information obtained from the registration means 6 is processed and stored for later use. This processing and control unit 9 may comprise a PLC known per se.

On some distance behind the registration means 6 a the cutting device 10 comprises two guidings 11 and 12 extending at some distance above the conveyor belt 2, along which guidings slides 15 and 16 are movable to and fro driven by motors 13 and 14. The slides 15 and 16 carry cutting means comprising nozzles 17 and 18 (indicated only schematically) for emitting a high pressure liquid jet, preferably a water jet. Generally the direction of the emitted liquid jet is perpendicular to the conveyor belt 2.

It is evident that the slides 15, 16 can be driven in any other way too. For example one possibility comprises replacing the guidings 11 and 12 by linear cylinders, such that the slides 15, 16 as it were act as the pistons of these linear cylinders. Cutting means differing from the illustrated nozzles 17 and 18 are conceivable too, for example cutting means with a mechanical action.

The cutting device 10, and especially the motors 13 and 14, is connected to the processing and control unit 9 through lines 19 and 20. Through these lines 19 and 20 the processing and control unit 9 provides the motors 13 and 14 with the required control signals, such that the nozzles 17 and 18 follow the desired track for correctly removing the head, dorsal fin, anal fin and tail fin from the flatfish.

As appears clearly in the FIGURE the guidings 11 and 12 include an angle with the transverse direction of the conveyor belt 2. As a result the nozzles 17 and 18 can also make cuts in the flatfish 7 extending perpendicularly to the direction of movement A of the conveyor belt 2.

Optionally end switches (not shown) could be positioned beside the guidings 11 and 12 for determining the end positions of the slides 15 and 16. Further means can be made for guaranteeing, that the slides 15 and 16 (thus nozzles 17 and 18) always return to a central position after completing the processing of a flatfish 7. This prevents an unnecessary loss of time, such that very quickly successive flatfish can be processed.

The cut which in the shown situation has already been made in the flatfish by nozzle 17 is indicated with 21. Correspondingly the cut made by nozzle 18 is indicated with 22.

Between the registration means 6 and the cutting device 10 a sensor 23 is positioned for determining the moment on which a flatfish 7 to be processed passes. Especially if the belt conveyor 1 comprises several adjoining conveyor belts the use of such a sensor 23 is important. Because if the flatfish 7 is transferred from one conveyor belt to another conveyor belt a shift of the flatfish may occur and the moment on which the flatfish 7 will reach the cutting device 10 is not exactly predictable, if one uses only the moment of passing the registration means 6. However, starting with the moment of passing the sensor 23 the moment on which the flatfish 7 reaches the cutting device 10 can exactly be determined, such that in dependency therewith the processing and control unit 9 can control the cutting device 10. The required connection between sensor 23 and processing and control unit 9 is realised by a line 24.

The sensor 23 may comprise a combination of a light emitting diode, which emits a ray of light which is reflected by a mirror 33 and reaches a photoelectric cell.

When determining the moment, on which a flatfish 7 reaches the cutting device 10 (as elucidated previously) it is assumed, that the velocity of the conveyor belt 2 is exactly known, such that the position of each point of the conveyor belt 2 may be determined at each moment. It is preferred however to registrate the position of the conveyor belt 2 using a pulse generator 25 which for example is connected to roll 3 and which through a line 26 is connected to the processing and control unit 9. The pulses generated by the pulse generator 25 are used by the processing and control unit 9 for exactly determining the position of the conveyor belt 2 at each moment, and thus the position of flatfish 7 positioned on this conveyor belt.

At the end of the conveyor belt 2 a flatfish 27 is represented which has been processed by the apparatus according to the invention. For the sake of clarity the separate parts of the flatfish 27 obtained after such a processing have been represented at some mutual distance. Visible are the head 28 with anal fin 29 connected thereto, dorsal fin 30 and tail fin 31 partially connected with the anal fin 29 and partially connected with the dorsal fin 30. The ready-to-cook product is referred to with 32.

Finally a control line 34 is indicated connecting the processing and control unit 9 with motor 5. This control line 34 enables a control of motor 5, for example for accelerating or decelerating the conveyor belt 2 during different stages of the processing of a flatfish 7.

The invention is not limited to the embodiment described before which may be varied widely within the scope of the invention.

I claim:

1. Apparatus for processing flatfish, comprising a conveyor means for the flatfish, registration means for determining the geometry of the flatfish and their position relative to said conveyor means, a cutting device for cutting loose the head, the dorsal fin, the anal fin and the tail fin from the flatfish in response to said registration means and with a control unit connected between said registration means and said cutting device for processing and storing information obtained from said registration unit for later use.

2. Apparatus according to claim 1, wherein said cutting device comprises at least two cutting means which are essentially transversaly to said conveyor means and mutually independently movable to and fro.

3. Apparatus according to claim 2, wherein the track followed by said cutting means includes an angle with the transverse direction of said conveyor means.

4. Apparatus according to claim 1 or 2, wherein said cutting device comprises means for re-centering said cutting means after completing the processing of said flatfish.

5. Apparatus according to claim 2, wherein said cutting means are nozzles for emitting a high pressure liquid jet.

6. Apparatus according to claim 1, wherein said registration means comprise an X-ray device.

7. Apparatus according to claim 1, further comprising a sensor positioned shortly ahead of said cutting device for determining the moment on which said flatfish passes.

8. Apparatus according to claim 7, wherein said sensor comprises a photoelectric cell.

9. Apparatus according to claim 1, wherein said conveyor means includes a pulse generator which is connected to said control unit.

10. Apparatus according to claim 1, wherein said conveyor means comprises a belt conveyor with a gauze conveyor belt.

* * * * *

UNITED STATES PATENT AND TRADEMARK OFFICE
CERTIFICATE OF CORRECTION

PATENT NO. : 5,192,243

DATED : MARCH 9, 1993

INVENTOR(S) : WILHELMUS J.H. WEUSTINK

It is certified that error appears in the above-identified patent and that said Letters Patent is hereby corrected as shown below:

On the title page, Item [30] Foreign Application Priority Data should read -- May 31, 1990 Netherlands................9001240 --.

Signed and Sealed this

Twenty-fifth Day of January, 1994

Attest:

BRUCE LEHMAN

Attesting Officer

Commissioner of Patents and Trademarks